UNITED STATES PATENT OFFICE 2,026,618

ESTERS OF N-P-AMINOARYL-CARBAMIC ACIDS AND PROCESS OF PRODUCING THE SAME

Robert E. Etzelmiller, Wilmington, Del., assignor to E. I. du Pont de Nemours & Company, Wilmington, Del., a corporation of Delaware No Drawing. Application July 18, 1934, Serial No. 735,819

7 Claims. (Cl. 260—105)

This invention relates to novel organic compounds, useful as intermediates for dyestuffs and process of producing them. More particularly, this invention deals with novel N-(amino-aryl)-alkyl-carbamates (so-called "urethanes") of the general formula:

$$XO\text{---}CO\text{---}NH\text{---}A\text{---}NH_2(m\text{- or }p\text{-})$$

in which formula X represents an alkyl, aralkyl, aryl or hydroaryl radical which may be further substituted by radicals such as alkyl, alkoxy or halogen; and A represents an arylene nucleus of the benzene or naphthalene series which contains an alkoxy group in ortho position to the carbamate group, and which may be further substituted by radicals such as alkyl, alkoxy, aryl, aryloxy, trifluoromethyl, and halogen; and in which both X and A are free from water solubilizing groups such as carboxylic-acid or sulfonic-acid groups.

I have found that compounds of the above general formula possess valuable utility as intermediates for azo dyestuffs.

It is accordingly an object of my invention to provide new organic compounds which are useful in the art of manufacturing dyestuffs. Other and further important objects of this invention will appear as the description proceeds.

My novel compounds may be prepared by various methods, among which the following are of particular interest.

1. A nitro-arylamine of the general formula:

$$(m\text{- or }p\text{-})NH_2\text{---}A\text{---}NO_2,$$

wherein A is an arylene radical of the benzene or naphthalene series, containing an alkoxy group in ortho position to the NH2 group, and optionally containing further substituents as defined above, is condensed with a chloro-carbonate of the general formula: XO—COCl, where X is an alkyl, aryl, aralkyl or hydroaryl radical as defined above, and which in turn may be obtained by phosgenation of the corresponding alcohol or phenol X—OH; the reaction yields a nitro-aryl-urethane, which may then be reduced to the corresponding amino-aryl-urethane by any of the usual methods for reducing nitro groups. The entire synthesis may be represented by the equations:

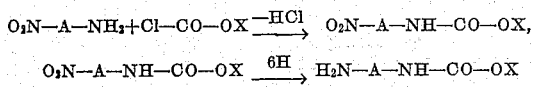

2. The diazo-salt of a water-soluble aryl amine, for instance a sulfonated aniline or naphthylamine derivative, is coupled to an arylamine of the general formula: HA—NH2, where A is an alkoxy arylene radical as above defined. The resulting amino-azo compound is condensed with a chlorocarbonate of the type: Cl—CO—OX, as above defined. This reaction gives an aryl-azo-aryl-urethane, which is then subjected to reduction in the usual manner, to break open the azo bridge, and yields a mixture of two aryl-amines. One of these is identical with the water-soluble arylamine initially employed, and the other is the sought amino-aryl-urethane. The entire reaction may be typified by the folowing series of equations:

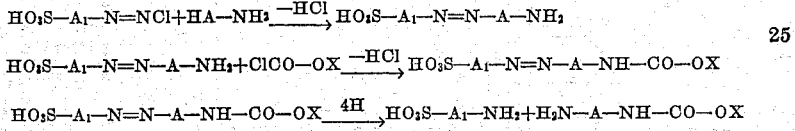

Since the by-product arylamine is water soluble, while the desired urethane is in most cases insoluble, the two can be readily separated from each other.

3. An arylamine of the type: HA—NH2, wherein A is an arylene radical as above defined, is condensed directly with a chlorocarbonate of the type: ClCO—OX, as above defined, to give the corresponding aryl-urethane. The latter is then nitrated according to any of the customary methods of nitration, and the nitro compound thus obtained is reduced in the usual manner to give the desired amino-aryl-urethane. The entire reaction, in this case, may be illustrated by the following equations:

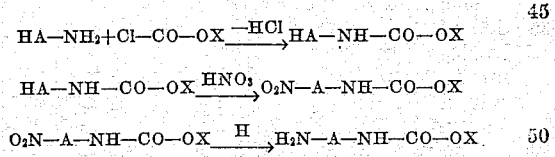

This invention will be more readily understood by reference to the following examples, in which all quantities are stated in parts by weight, but it is not intended to be limited thereby.

EXAMPLE 1

N-(5-amino-2-methoxy-phenyl)-methyl carbamate. (Illustrating Synthesis No. 1)

A mixture of | Parts
---|---
4-Nitro-2-amino-anisole | 16.8
Benzene | 200.0
Methyl chlorocarbonate | 20.0
Potassium carbonate (anhydrous) | 16.0 is refluxed with stirring for 8–10 hours. The mixture is then cooled and the benzene removed by filtration.

The filter cake is suspended in 100 parts of water, cooled to 10° C., and treated with 15 parts of 20° Bé. hydrochloric acid and 3 parts of sodium nitrite to diazotize any uncondensed p-nitro-o-anisidine. The mass is then again filtered, and the insoluble nitro-urethane compound is purified by successive crystallization from alcohol and from water. The intermediate product thus obtained, most probably corresponds to the formula:

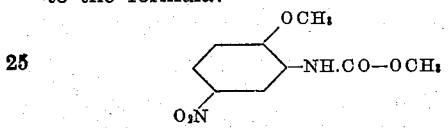

and melts at 136–137° C.

The nitro-body is suspended in 100 parts of methyl alcohol, and reduced by hydrogenation at 100° C. under an initial pressure of 500 pounds, using a reduced nickel catalyst. When the reduction is complete, as indicated by the fact that the pressure has become constant, the pressure is released, and the hot mixture is filtered to remove the catalyst. The filtrate is evaporated to remove alcohol and water, and the oily residue is cooled.

The product constitutes N-(5-amino-2-methoxy-phenyl)-methyl-carbamate (or "-urethane"), and may be represented by the following formula:

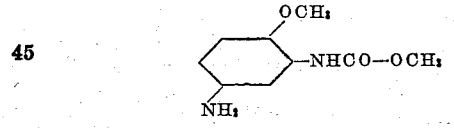

If, in the above process, the 16.6 parts of 4-nitro-2-amino-anisole are replaced by 18.3 parts of 4-nitro-2-amino-phenetole, the new base of the formula:

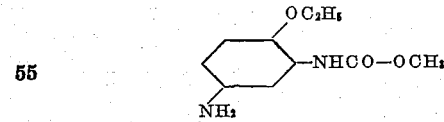

is obtained. Its properties are similar to the product obtained above.

EXAMPLE 2

N-(4-amino-2-methoxy-phenyl)-methyl-carbamate

16.8 parts of 5-nitro-2-amino-anisole are condensed with 20 parts of methyl chlorocarbonate, as described in Example 1, and the (4-nitro-2-methoxy-phenyl)-methyl-carbamate thus obtained, (M. P. 150–1°), is reduced by hydrogenation as in Example 1.

The product has the following structure:

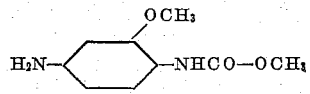

and melts at 105–107° C.

If, in the above example, 20.4 parts of 4-chloro-5-nitro-2-amino-anisole are substituted for the 5-nitro-2-amino-anisole, the new base of the following formula is obtained:

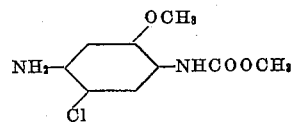

EXAMPLE 3

N-(4-amino-5-methyl-2-methoxy-phenyl)-methyl-carbamate. (Illustrating Synthesis No. 3)

A mixture of | Parts
---|---
4-methoxy-3-amino-toluene | 13.7
Benzene | 200.0
Methyl chlorocarbonate | 14.0 is refluxed with stirring for 7–8 hours. The benzene is removed by steam distillation and the urethane formed in the reaction is filtered off from the cooled mixture.

The urethane is then subjected to nitration by dissolving the same in approximately 200 parts of glacial acetic acid and slowly adding 9.2 parts of nitric acid (70%) at 20 to 25° C. On diluting with water, the nitro-body separates almost quantitatively. It is filtered and reduced with iron and acetic acid in the usual manner for reductions of this type. The amine is extracted from the iron sludge with alcohol, and precipitated by diluting with water. Without further purification the base melts at 97–99° C.

The product has the probable formula:

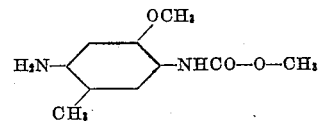

By substituting in one experiment an equivalent amount of 4-chloro-2-amino-anisole in the above procedure, (4-amino-5-chloro-2-methoxy-phenyl)-methyl carbamate was obtained, which appeared to be identical with the product mentioned in Example 2.

EXAMPLE 4

N-(4-amino-2,5-dimethoxy-phenyl)-methyl-carbamate

15.3 parts of 2,5-dimethoxy-aniline are condensed with methyl-chlorocarbonate, nitrated and reduced as in Example 3. Without further purification the base melts at 122–124° C. It corresponds most probably to the following formula:

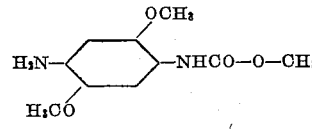

Other carbamates or "urethanes" of similar structure are obtained by using other chlorocarbonates; for example, ethyl-, butyl-, benzyl-chlorocarbonate, etc.

EXAMPLE 5

N-(4-amino-2,5-dimethoxy-phenyl)-β-methoxy-urethane

18.1 parts of 2,5-diethoxy-aniline are condensed with 15.0 parts of β-methoxy-ethyl-chlorocarbonate, nitrated and reduced as in Example 3.

The product has most probably the following formula:

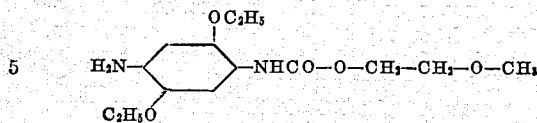

EXAMPLE 6

N-(4-amino-2,5-diethoxy-phenyl)-n-butyl-carbamate

18.1 parts of 2,5-diethoxy-aniline are condensed with 15.0 parts of n-butyl chlorocarbonate and nitrated as in Example 3. The nitro-body is reduced in methyl alcohol by hydrogenation at 100° C. using a reduced nickel catalyst, as described in Example 1. The base is precipitated from the filtered alcohol solution by diluting with water. The melting range of the base thus obtained is 75-78° C. It has the folowing formula:

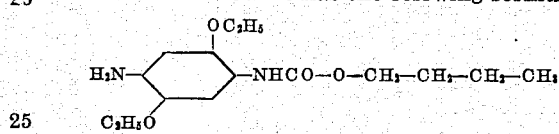

EXAMPLE 7

N-(4-amino-2,5-diethoxy-phenyl)-isopropyl carbamate

18.1 parts of 2,5-diethoxy-aniline are condensed with 15.0 parts of iso-propyl chlorocarbonate, nitrated and reduced as in Example 4. Without further purification the base melts at 92-96° C. It has most probably the following formula:

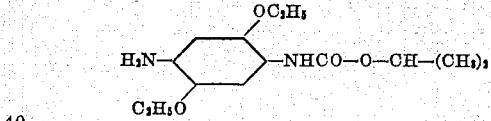

EXAMPLE 8

N-(4-amino-2,5-diethoxy-phenyl)-benzyl-carbamate

18.1 parts of 2,5-diethoxy-aniline are condensed with 20.0 parts of benzyl chlorocarbonate and nitrated as in Example 3. The nitro-body is reduced in methyl alcohol by hydrogenation at 100° C. using a reduced nickel catalyst, as described in Example 1. The base is precipitated from the filtered alcohol solution by diluting with water. It melts at about 103-106° C., and corresponds in structure most probably to the following formula:

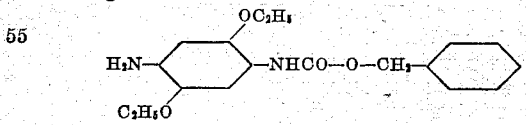

EXAMPLE 9

N-(4-amino-2,5-diethoxy-phenyl)-methyl-carbamate. (Illustrating Synthesis No. 2)

Sulfanilic acid is diazotized and coupled to 2,5-diethoxy-aniline in the usual manner. For instance, one may proceed as follows:

17.3 parts of sulfanic acid are dissolved in 150 parts of water containing 5.3 parts of sodium carbonate, and diazotized at 10-15° C. by adding 30 parts of hydrochloric acid (30%) and a solution of 6.9 parts of sodium nitrite in 25 parts of water. 18.1 parts of 2,5-diethoxy-aniline, dissolved at 70-75° C. in 150 parts of water containing 12.5 parts of hydrochloric acid (30%), are then added, the temperature being maintained at 15-20° C. by the addition of ice. The mineral acidity is then neutralized by the addition of sodium acetate; and after stirring 20-30 minutes, the coupling is complete.

The coupling product, which is 4'-sulfo-phenyl-azo-2,5-diethoxy-aniline, is filtered from the reaction mixture and dissolved in a dilute solution of sodium carbonate. 14 to 18 parts of methyl chlorocarbonate are then added, and a solution of sodium carbonate is fed in as necessary, to maintain a slight alkalinity. When the condensation is complete, the mixture is salted to a concentration of 20% and filtered.

The press cake is dissolved in hot water and added to a mixture of 30 parts of iron, 150 parts of water and 5 to 10 parts of acetic acid at 100-103° C. When the reduction is complete, the mixture is made alkaline with soda ash, filtered and washed. The iron sludge is extracted with alcohol, and the amine precipitated from the alcoholic extract as slightly colored crystals, by the addition of water. Its melting point is about 103° C., and it corresponds most probably to the formula:

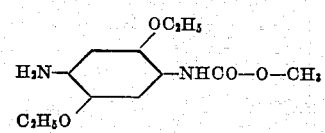

By substituting an equivalent weight of 2-methoxy-1-amino-naphthalene for 2,5-diethoxy-aniline in the above procedure, (4-amino-2-methoxy-1-naphthyl)-methyl-carbamate is obtained.

N-(4-amino-2,5-diethoxy-phenyl)-methyl carbamate may be obtained also by Synthesis No. 3, as illustrated by Example 3. For instance, one may heat 18.1 parts of 2,5-diethoxy-aniline in 100 parts of water to 80-85° C. to melt the amine. 20 parts of carbon tetrachloride are then added and the mixture cooled to 60-70° C. 14 to 16 parts of methyl chlorocarbonate are then added, and sufficient sodium carbonate to maintain a slight alkalinity to brilliant yellow papers. The mixture is then heated to 85-90° C. to remove the carbon-tetrachloride, cooled and the condensation product filtered. The nitration is carried out as in Example 3, and the nitro-body is then reduced with iron and acetic acid or by any other suitable method.

To illustrate a still different mode of operation, one may carry out the urethane synthesis precisely as described in Example 3, and then effect the reduction by the hydrogenation method illustrated in Example 1. For instance, one may proceed as follows:

A mixture of

| | Parts |
|---|---|
| 2,5-diethoxy-aniline | 18.1 |
| Benzene | 200.0 |
| Methyl chlorocarbonate | 11.0 | is refluxed with stirring for six hours. The benzene is then removed by steam distillation and the N-(2,5-diethoxy-phenyl)-methyl-carbamate which separates as an oil, but quickly solidifies on cooling (M. P. 87-88° C.), is filtered off and dissolved in 150 parts of glacial acetic acid. Nitration is effected by slowly adding 9.3 parts of 70% nitric acid at 20-25° C. After diluting the nitration mass with water the nitro-body is obtained by filtration and may be reduced in methyl alcohol by hydrogenation at 100° C. using a reduced nickel catalyst. When the reduction is complete, the hot mixture is filtered to remove the catalyst. Most of the alcohol is then removed by distillation and the free base obtained by adding water and allowing the mixture to cool. It may be recrystallized from alcohol and water.

EXAMPLE 10

N-(4-amino-2,5-diethoxy-phenyl)-urethane 18.1 parts of 2,5-diethoxy-aniline are condensed with 14.0 parts of ethyl chlorocarbonate, nitrated and reduced as in Example 6. The product melts at 101–102° C., and corresponds most probably to the following structure:

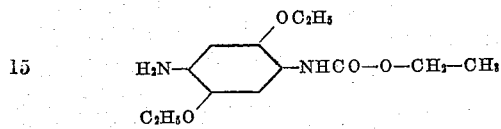

It will be understood that while I have illustrated my various methods of synthesis by the preparation of different specific compounds, the methods are interchangeable and may be applied substantially to any of the mentioned compounds. This is particularly illustrated in Example 9, where N-(4-amino-2,5-diethoxy-phenyl)-methylcarbamate has been shown as susceptible of preparation by three distinct procedures.

The methods above disclosed are equally applicable to the preparation of many other compounds, not specifically mentioned in the preceding description. Of particular interest among such further compounds which come within the scope of my invention are compounds of the general formula:

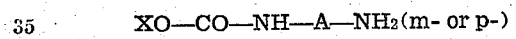

where the X-portion of the molecule is a methyl-, ethyl-, propyl-, or other alkyl radical;
β-chlor-ethyl-, or other halogenated alkyl radical;
β-methoxy-ethyl-, or similar ether radical;
phenyl-, cresyl-, and other aryl radical;
an alkyl-, alkoxy- or halogen substituted phenyl radical;
cyclohexyl-, tetrahydro-naphthyl and other hydroaromatic radical;
benzyl-, or a substituted aralkyl group.

Similarly, the "A" radical may be an arylene nucleus of either the benzene or naphthalene series containing an alkoxy group in ortho position to the CO—NH group, but optionally being further substituted by such groups as methyl, or other alkyl radicals, methoxy or other alkoxy radicals, phenyl or other aryl radicals, halogens, phenoxy or other aryloxy groups.

All these compounds possess the common characteristic of being adapted for the manufacture of dyestuffs of the azo class, particularly of the ice-color series. Many of the dyestuffs thus prepared belong to the commercially valuable ranges of color and are characterized by excellent fastness qualities.

It will be understood that the modes of operation indicated in the above specific examples may be varied within wide limits, to suit one's convenience or the particular compound operated upon. Thus, the reaction of the aryl-amine or nitro-arylamine with the chloro-carbonate to produce an intermediate urethane or carbamate, may be carried out in any suitable inert organic medium, for instance benzene, toluene, carbon tetrachloride, tetrachlorethane, etc., or it may be carried out in aqueous medium. In either case, acid binding agents may be added, for instance sodium acetate, sodium bicarbonate, sodium hydroxide, sodium carbonate, potassium carbonate, etc. Again, the acid binding agent may be omitted, the reflux temperature being depended upon to carry off the HCl formed in the reaction.

The nitro compound obtained in Syntheses 1 and 3, may be reduced by hydrogenation with a catalyst, in the presence of a solvent or diluent, as illustrated in Example 1; by the aid of an acid such as acetic or hydrochloric, and a metal, such as iron, tin, or zinc, in aqueous solution, as illustrated, for instance, in Example 3; or by any other suitable or standard method for reducing nitro groups to amines, for instance, by the action of sodium sulfide or sulfhydrate.

In Synthesis No. 2, the water soluble arylamine to be diazotized may be any arylamine of the benzene or naphthalene series containing a water solubilizing group, such as sulfonic acid or carboxylic acid. The subsequent reduction of the azo group may be effected by any of the common methods, such as by the action of iron in the presence of ferrous or other salts, by the action of a metal such as tin or zinc in the presence of an acid, by the action of stannous chloride, or by the action of sodium hydrosulfite.

The nitration in Synthesis No. 3, may be effected in any suitable manner, following standard practice, but should preferably avoid strongly mineral acid media which might act to decompose the ester. Best results are obtained with an organic solvent such as acetic acid, or in aqueous suspension, using nitric acid.

Many other variations and modifications are possible in my preferred procedure above set forth, without departing from the spirit of this invention.

I claim:

1. A compound of the general formula

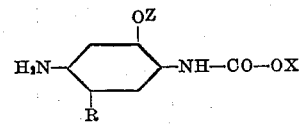

wherein X stands for an alkyl or aralkyl radical, R stands for hydrogen, halogen, methyl or a lower alkoxy group, and Z stands for methyl or ethyl.

2. The process of producing a compound of the general formula as defined in claim 1, which comprises reducing the corresponding nitro compound.

3. Esters of N-(amino-2,5-dialkoxy-phenyl)-carbamic acids.

4. The process of producing a nitro-aryl-carbamic acid ester as defined in claim 3, which comprises condensing a 2,5-dialkoxy-4-nitroaniline with an organic chlorocarbonate of the general formula XO—CO—Cl, wherein X stands for an alkyl or aralkyl radical, recovering the intermediately formed 4-nitro-2,5-dialkoxy-phenyl-carbamate, and reacting upon the latter with a reducing agent, whereby to reduce the nitro group to an amine.

5. N-(4-amino-2,5-dialkoxy-phenyl)-alkyl-carbamate.

6. N-(amino-2,5-dialkoxy-phenyl)-methyl-carbamate.

7. N-(amino-2,5-dialkoxy-phenyl)-urethane.

ROBERT E. ETZELMILLER.